Figure 1:
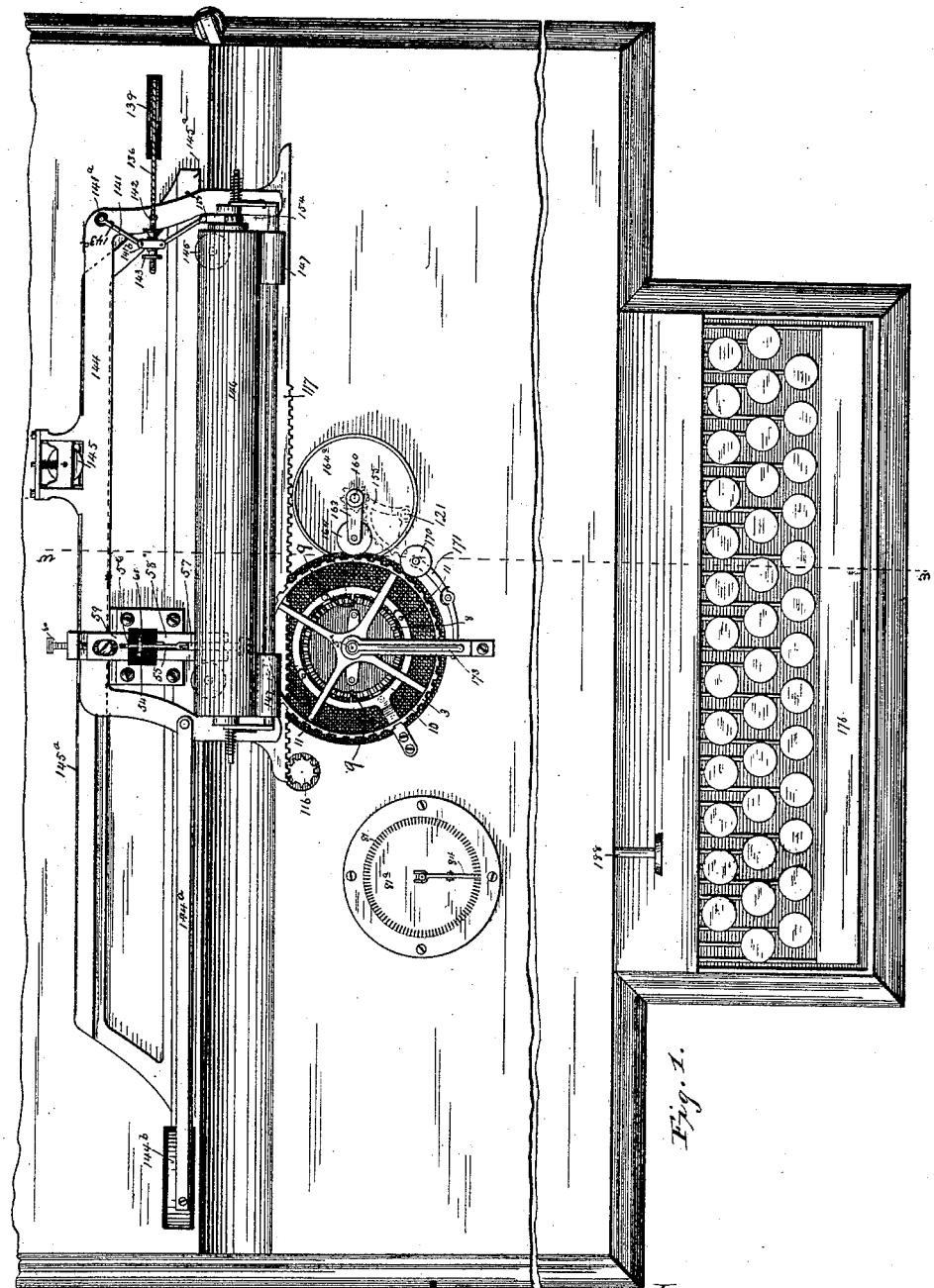

(No Model.) C. T. MOORE. 10 Sheets—Sheet 1.
TYPE WRITING MACHINE.

No. 419,864. Patented Jan. 21, 1890.

Witnesses. Inventor.
Chas. R. Butt. Charles T. Moore
A. J. Stewart. by Church & Church
 his Attorneys.

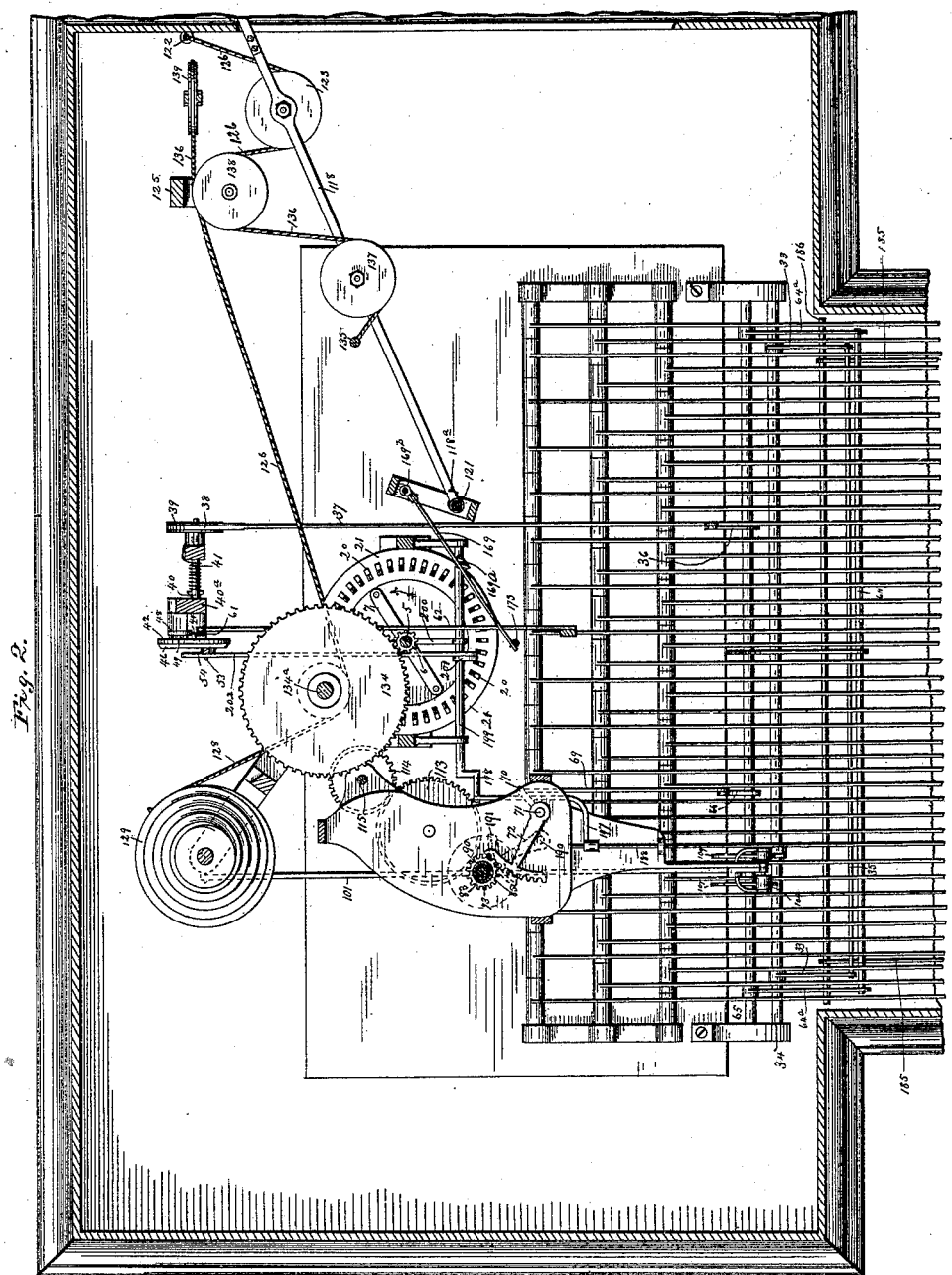

(No Model.)  10 Sheets—Sheet 3.
C. T. MOORE.
TYPE WRITING MACHINE.
No. 419,864. Patented Jan. 21, 1890.
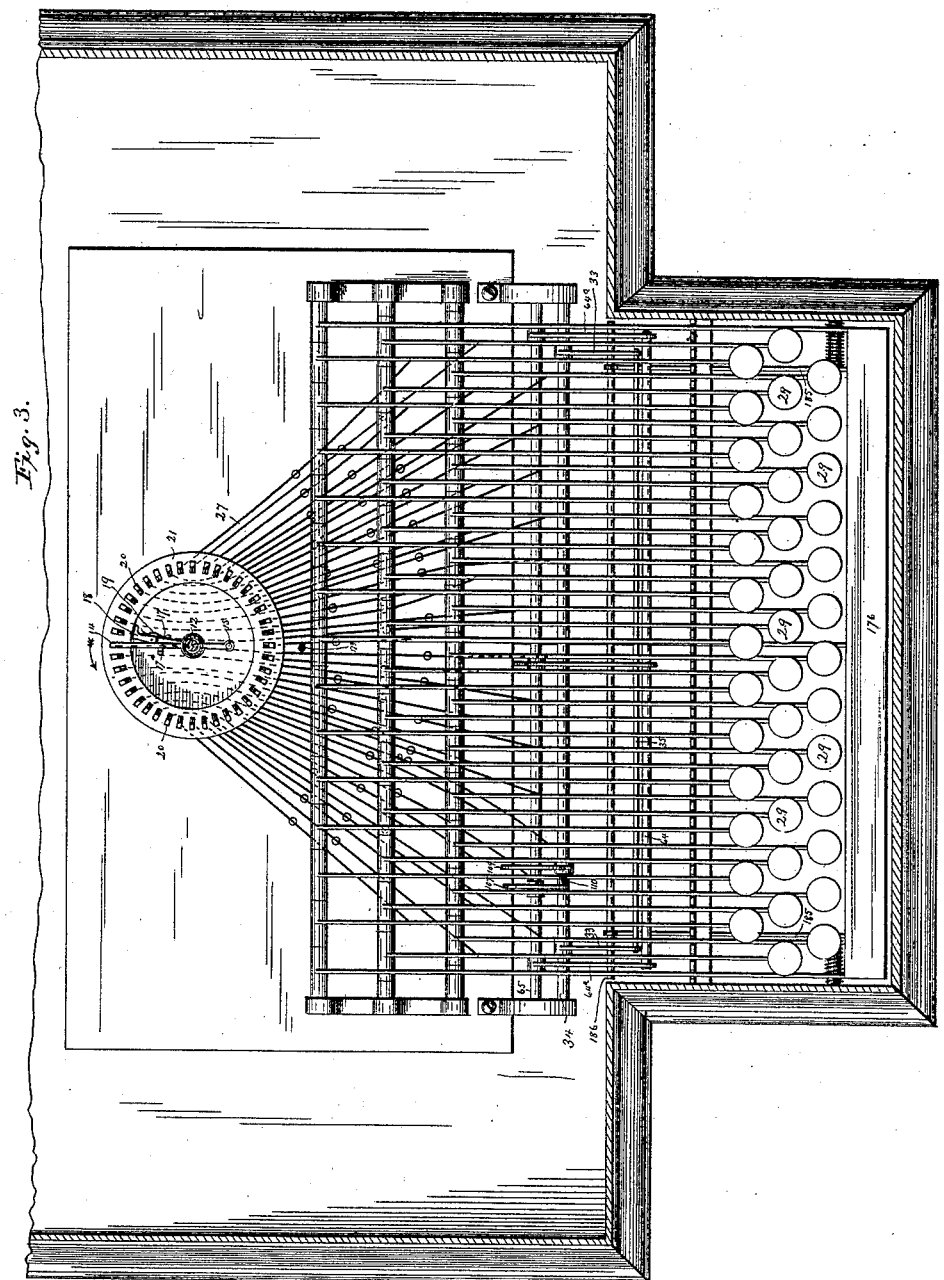

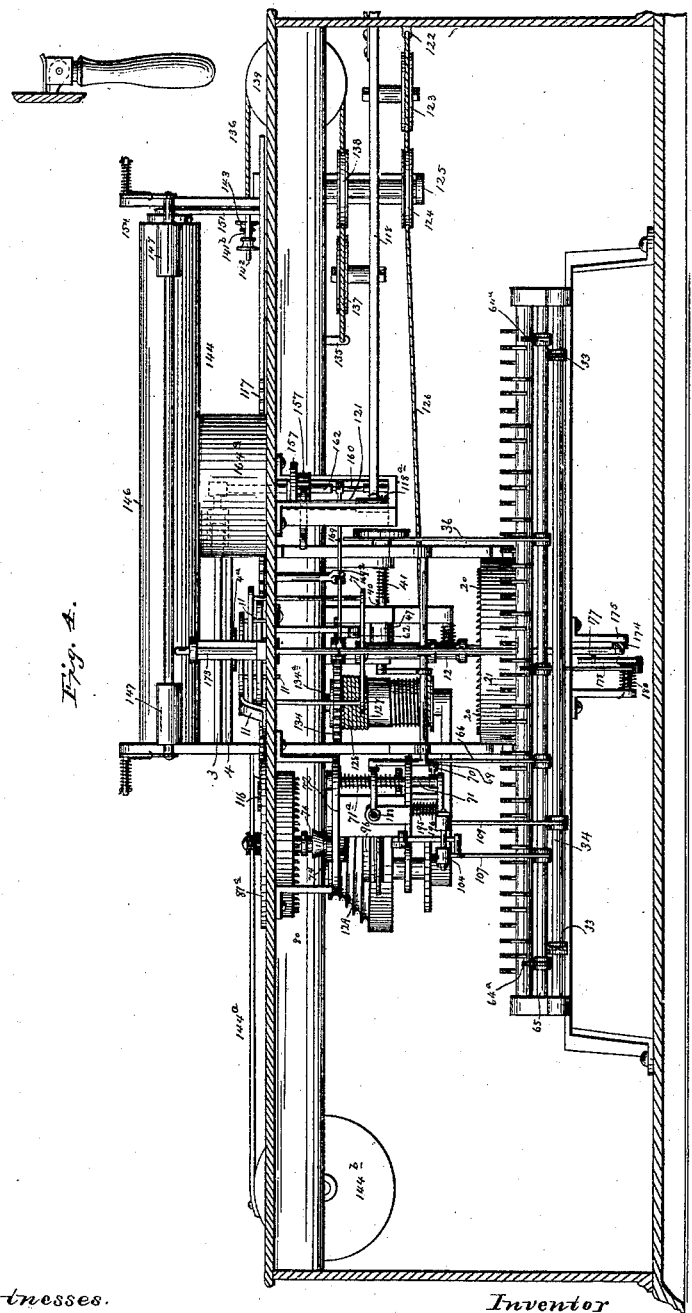

(No Model.)  10 Sheets—Sheet 5.
C. T. MOORE.
TYPE WRITING MACHINE.
No. 419,864.  Patented Jan. 21, 1890.
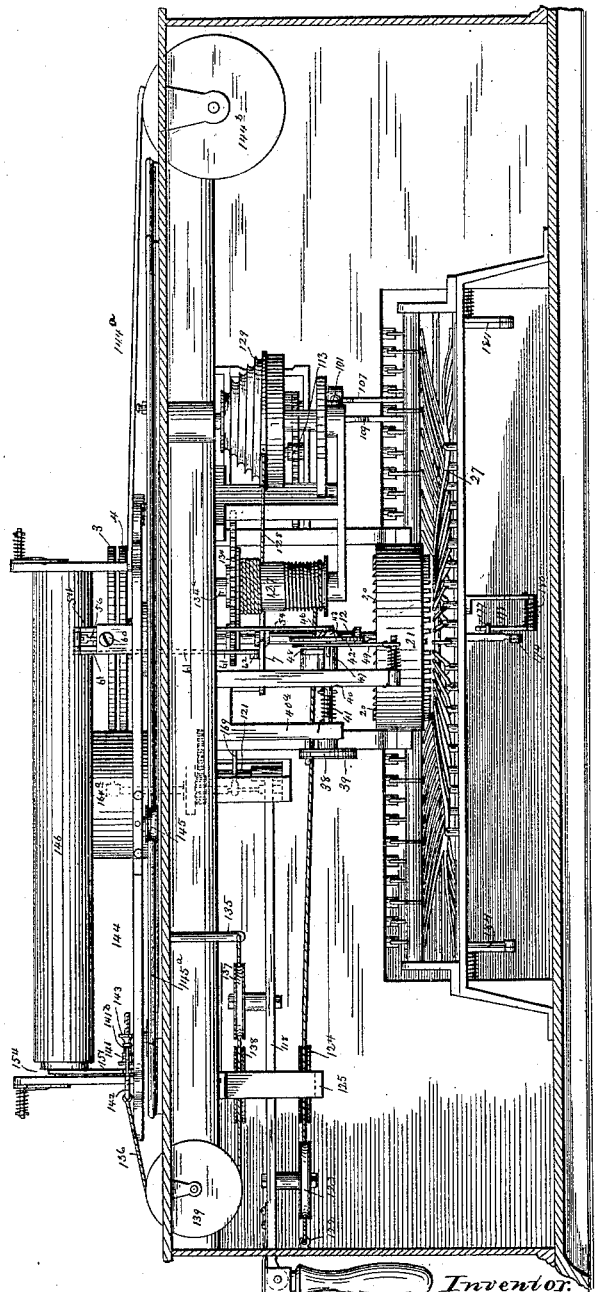
Witnesses.
Chas. R. Burr.
A. J. Stewart.
Inventor:
Charles T. Moore
by Church & Church
his Attorneys.

(No Model.) 10 Sheets—Sheet 6.
C. T. MOORE.
TYPE WRITING MACHINE.
No. 419,864. Patented Jan. 21, 1890.
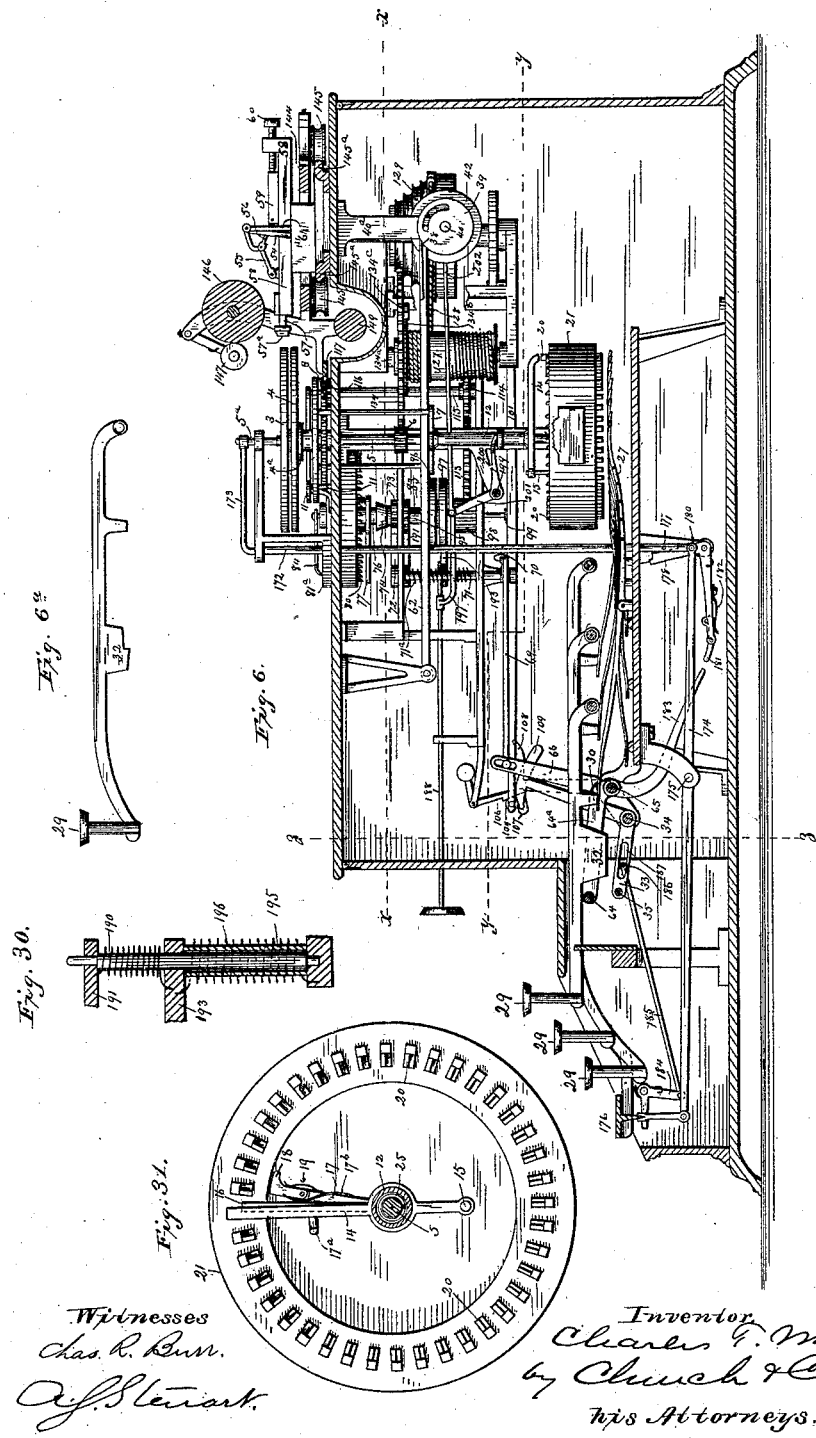
Witnesses
Chas. R. Burr.
A. J. Stewart.
Inventor
Charles T. Moore
by Church & Church
his Attorneys.

(No Model.) 10 Sheets—Sheet 7.
C. T. MOORE.
TYPE WRITING MACHINE.
No. 419,864. Patented Jan. 21, 1890.
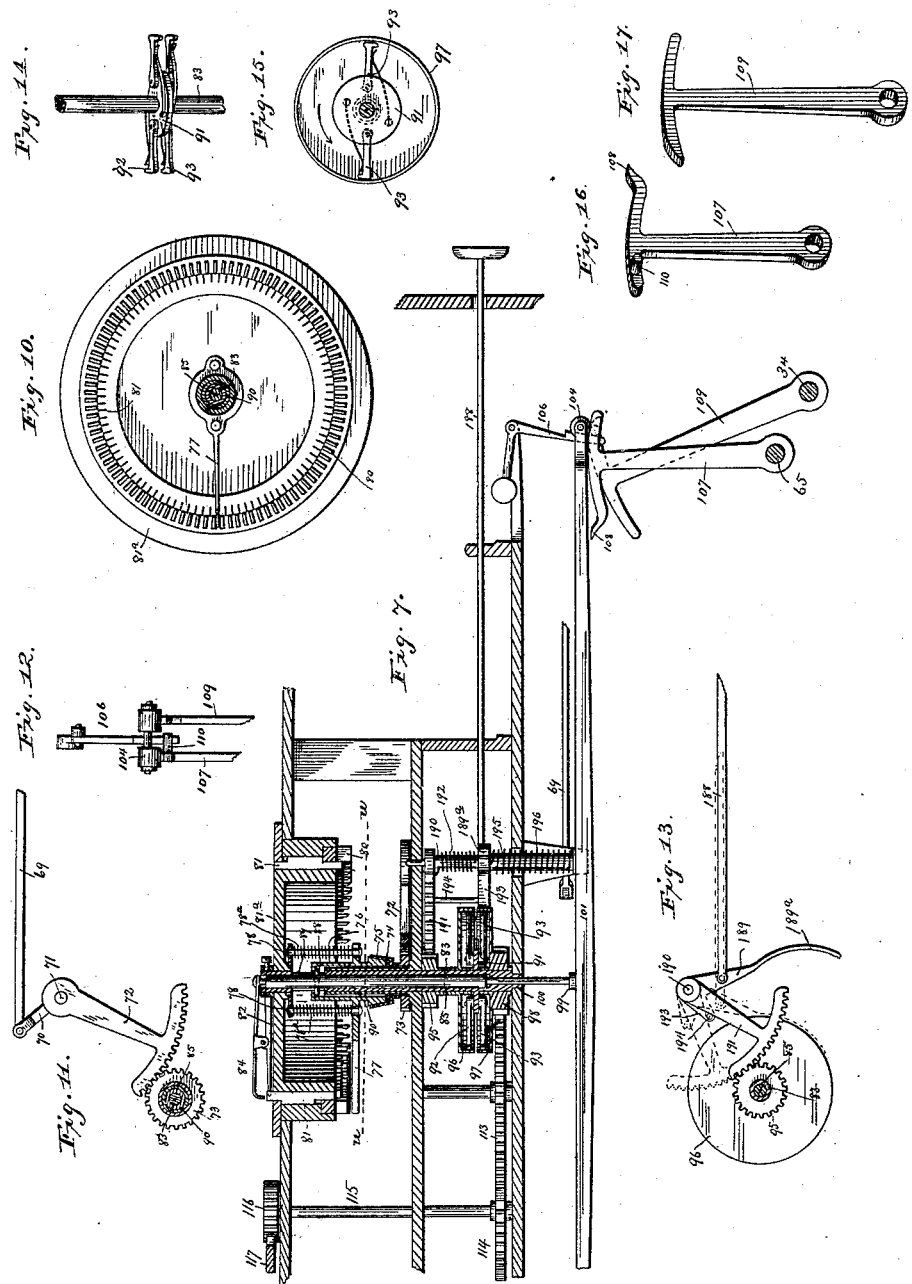
Witnesses.
Chas. R. Burr.
A. J. Stewart.
Inventor.
Charles T. Moore
by Church & Church
his Attorneys.

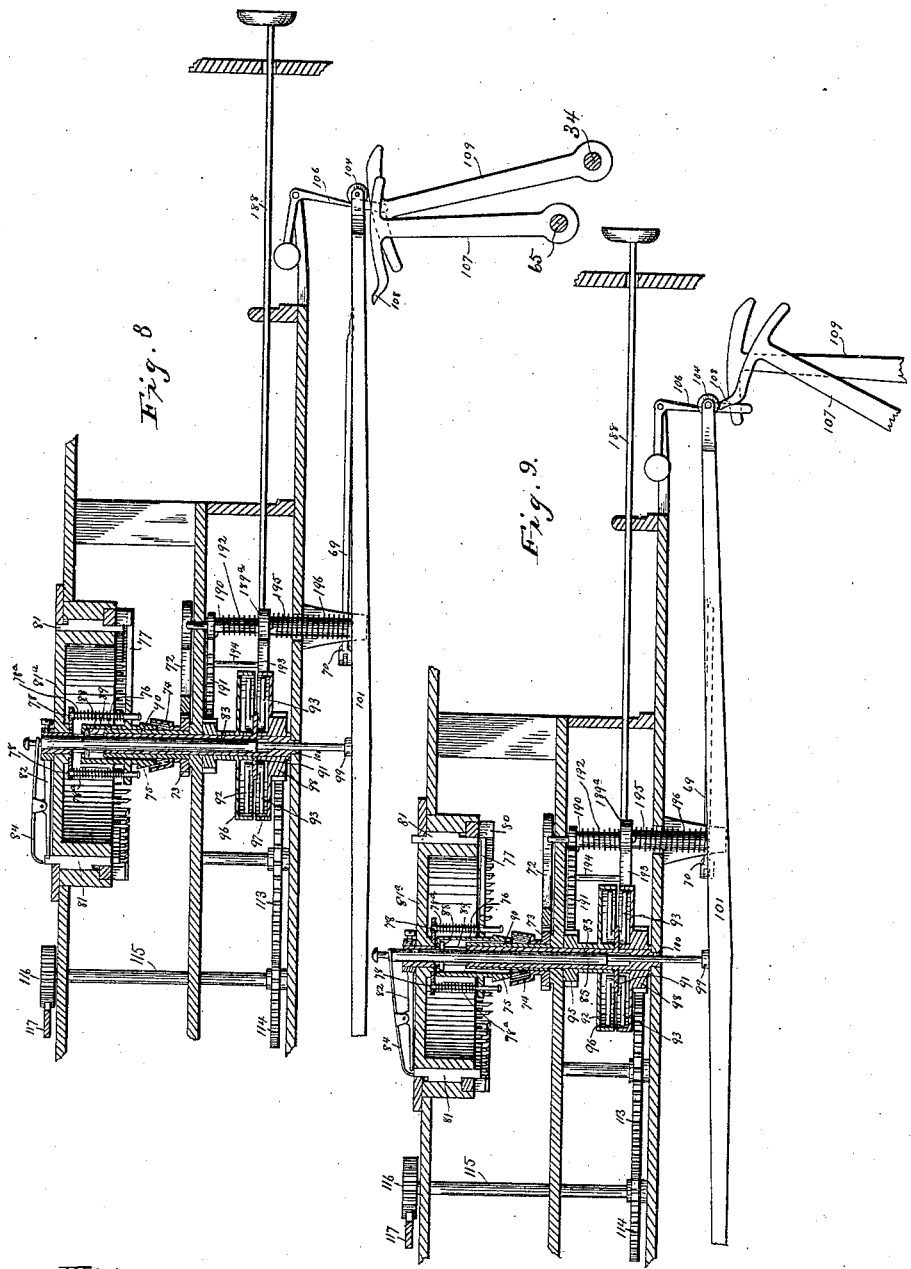

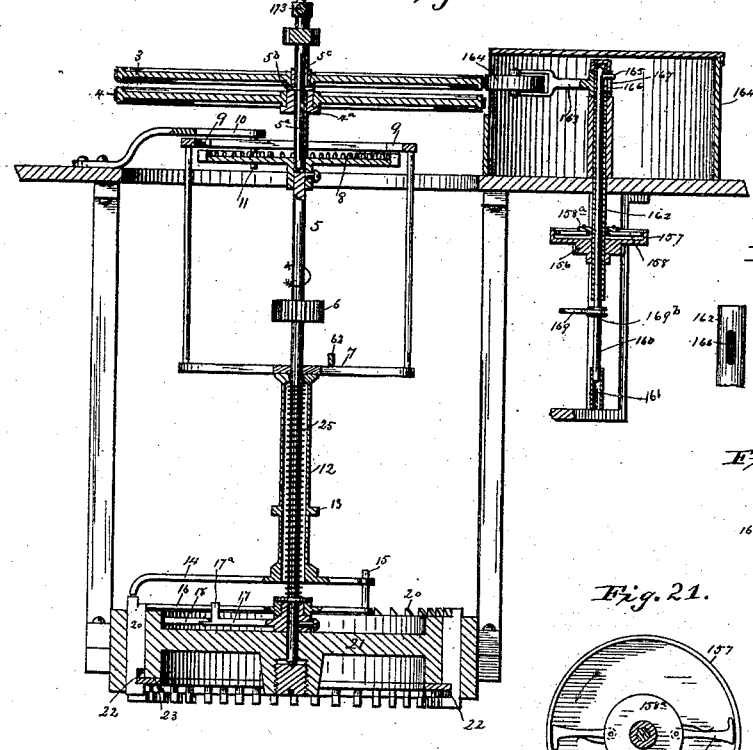

(No Model.)

C. T. MOORE.
TYPE WRITING MACHINE.

No. 419,864. Patented Jan. 21, 1890.

Witnesses
Chas. R. Burr
O. J. Stewart

Inventor:
Charles T. Moore
by Church & Church
his Attorneys.

UNITED STATES PATENT OFFICE.

CHARLES T. MOORE, OF WASHINGTON, DISTRICT OF COLUMBIA.

TYPE-WRITING MACHINE.

SPECIFICATION forming part of Letters Patent No. 419,864, dated January 21, 1890.

Application filed December 23, 1886. Serial No. 222,416. (No model.)

*To all whom it may concern:*

Be it known that I, CHARLES T. MOORE, of Washington, in the District of Columbia, have invented certain new and useful Improvements in Type-Writing Machines; and I do hereby declare the following to be a full, clear, and exact description of the same, reference being had to the accompanying drawings, forming a part of this specification, and to the figures of reference marked thereon.

My invention has for its object to provide a type-writer in which the types or characters employed are of variable widths, like ordinary printers' type, in which the spacing mechanism is constructed to feed the record each time a key is struck a distance corresponding to the width of the character printed by the striking of such key, and in which the impressions are made directly from the types or characters employed and by the aid of ordinary printers' ink. In a word, my aim is to provide a machine which will turn out work exhibiting that clearness and uniformity of impression and accuracy and regularity of spacing found at present only in printers' press-work.

In ordinary type-writing machines each character is printed upon the striking of the key employed for designating that character, and the act of designation and the act of printing are so closely identified and happen so nearly simultaneously as to amount practically to but one act, the result being that where a wrong key is struck the character corresponding to that key is printed and recorded before an opportunity is given to correct the error, and when a correction is afterward attempted to be made the time required to erase the wrongly-recorded character, adjust back the record, and print over the erasure the proper character militates greatly against the speed and general efficiency of the machine. An apprehension of this serious defect has led me to introduce an entirely new principle of operation into machines of this class—to wit, the principle of designating or setting for operation a given character upon the striking of a given key, and subsequently printing the character so designated upon the striking of the same or another key for the designation of the same or a different character. By thus having the printing of a character consequent not upon the designation of itself, but upon the designation of the next succeeding character, an opportunity is afforded to correct an error due to the striking of a wrong key before said error is recorded on the paper, and the speed and general efficiency of the machine are thereby promoted. There are of course many ways in which this principle of operation may be embodied, all falling within the scope of my invention; but I propose herein to describe only one embodiment of it, believing that more will not be required to a full and clear understanding of it.

Figure 29:
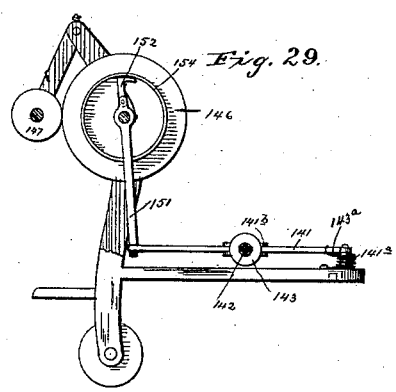

Referring to the accompanying drawings, Figure 1 is a top plan view of the machine with a portion of the casing of the type-wheel and inking mechanism removed. Fig. 2 is a sectional plan view taken on the line $x\ x$, Fig. 6. Fig. 3 is a sectional plan view taken on the line $y\ y$, Fig. 6. Fig. 4 is a sectional elevation taken on the line $z\ z$, Fig. 6. Fig. 5 is a rear elevation of the machine with the casing in section. Fig. 6 is a vertical sectional view taken on the line $w\ w$, Fig. 1; Fig. $6^a$, a detail view of one of the finger-keys. Figs. 7, 8, and 9 represent views of the spacing mechanism, showing the same in different positions. Fig. 10 is a sectional view taken on the line $u\ u$, Fig. 7, looking upward. Figs. 11, 12, 13, 14, 15, 16, and 17 represent views of various parts of the spacing mechanism. Fig. 18 is a vertical sectional view of the type-wheels and the means for arresting the rotation of the same, also showing the inking mechanism. Figs. 19, 20, and 21 represent details of the inking mechanism. Figs. 22 to 28, inclusive, are views of the impression mechanism. Fig. 29 is an end view of the paper-carriage, showing means for effecting the feed of the paper. Fig. 30 is a vertical sectional view through shaft 190, Fig. 7. Fig. 31 is a plan view of the lock of the type-wheel-arresting mechanism.

Referring now particularly to Figs. 1, 2, 3, 4, 6, and 18, numbers 3 and 4 represent two type-wheels, secured one above the other to a common hub $4^a$, mounted on a shaft 5, as seen in Fig. 18. A pin $5^b$ passes through the hub $4^a$, through a longitudinal slot $5^c$ in said shaft 5, and through a short shaft $5^a$, and operates to cause the type-wheels to rotate when the shaft 5 is rotated, and yet permitting the said shaft 5ª and the type-wheels to be raised or lowered independently, so as to bring one or the other of the type-wheels opposite to and in position to co-operate with the impression-surface 57ª. As a means for thus shifting the position of the type-wheels with respect to the impression-surface, I connect to the upper end of the shaft 5ª a rod 173, which extends horizontally a short distance and then passes down vertically to near the bottom of the machine, where it is articulated to a lever 174, pivoted at 175, and arranged to be operated by a key 176, which I term the "upper-case key." By pressing upon this key 176 the type-wheels, through the connections named, are raised, so as to bring the lower wheel into position for printing, said lower wheel bearing on its periphery the upper-case characters. The lower-case characters are arranged upon the periphery of the upper wheel.

Each time the type-wheels are raised the upper notched arm of a bell-crank lever 178 is forced by a spring 180 (see Figs. 4 and 6) under a pin 177 on the rod 173 and holds the latter and the connected type-wheels in elevated position. This movement of the bell-crank lever causes its longer arm to be raised and a latch 181, mounted thereon and kept closed by a spring 182, to be swung into the path of an arm 183, that is mounted on a shaft 65, which extends transversely of the machine, and which is rocked or oscillated each time one of the keys of the key-board is depressed through the medium of a transverse bar 64, that extends beneath the keys and is connected to the said shaft 65 by arms 64ª, as seen in Figs. 2, 3, and 6. When a key is depressed, the arm 183 strikes the latch 181, trips the latter, and passes above it; but when said key is released and the arm 183 returns to first position said arm in its descent strikes the latch, which is now immovable, and tilts the bell-crank lever sufficiently to cause the withdrawal of its notched arm from beneath the pin on the rod 173, thus permitting the said rod and the type-wheels connected to it to drop to normal position.

Secured to the type-wheel shaft 5 is a pinion 6, with which meshes a gear-wheel 134, mounted loosely on a shaft 134ª and connected to a barrel or drum 127 on said shaft by a ratchet-wheel 134ᵇ on said drum and a spring-pawl 134ᶜ on said gear 134, as shown in Fig. 6. To this barrel is attached one end of a cord 128, the other end of said cord being attached to a fusee 129, that is adapted to be rotated by a spring arranged within it in the usual manner. This spring-impelled fusee tends to draw the cord 128 from the barrel 127, and thereby rotate said barrel, and through the described gearing rotate the type-wheel shaft forward in the direction indicated by the arrow, Figs. 2, 3, and 18.

As a means for rewinding the cord 128 upon the barrel, I attach to the barrel another cord 126, which passes thence over a pulley 124, mounted in a bracket or hanger 125, thence around a pulley 123, mounted on a swinging hand-lever 118, and thence to a stationary part of the frame, as at 122. Upon the lever 118 being drawn forward the said cord 126 will be withdrawn from the barrel 127, and in so doing will rotate the latter and rewind thereon from the fusee the cord 128. By this provision the fusee is enabled to be kept at all times wound up in operative condition, its power being renewed each time the hand-lever is drawn forward.

Secured to the type-wheel shaft 5 near its lower end is an arm 17, Figs 3 and 18, which is provided with a projection 17ª, and is connected through a spring 17ᵇ to a swinging arm 16, mounted loosely upon the hub of the arm 17, as shown. This arm 17 also carries a swinging friction-pawl 18, which is kept pressed against the inner circumference of the dial 21 by a spring 19, and prevents any return movement or backlash of the arms 17 and 16 when said arms are arrested after an advance movement. The outer end of this arm 16 is adapted to engage with the side of one of a series of stop-pins 20, arranged in a dial 21 concentrically to the type-wheel shaft, as shown in Fig. 18. These stop-pins 20 are as many in number as the keys of the key-board, and each is capable of a vertical movement in the dial, limited as to extent by the length of a slot 22 formed in it, and into which projects a ring 23.

Beneath the dial are arranged a series of fingers or levers 27, corresponding in number to the number of pins employed, the ends of said levers or fingers occupying a position immediately beneath said pins. These levers in turn are adapted to be operated upon by the keys 29 of the key-board. Whenever a key is struck, the lever of finger 27 corresponding to it is vibrated and throws up the corresponding pin in the dial into the path of the swinging arm 16, as shown in Fig. 18, so as to arrest the latter when released, as will be hereinafter more fully described.

Surrounding the type-wheel shaft 5 is a sleeve 12, which carries at its lower end an arm 14, whose shorter portion is perforated and is adapted to slide up and down upon a pin 15 on the shorter portion of the arm 16, but whose longer portion extends out over the dial and terminates immediately above the stop-pins.

Upon the upper end of the sleeve 12 rests a yoke 7, which is provided at its upper portion with projections 9, that are adapted when the yoke is lowered to engage with the teeth of a locking-wheel 8, secured rigidly to the type-wheel shaft. This yoke 7 has no rotative movement; but it is guided in its vertical movements by means of pins 11, depending from a bracket 10 and passing through guide-perforations, as shown. A spring 25, arranged within the sleeve 12, operates to keep the said sleeve in an elevated position, and consequently the arm 14 out of contact with the stop-pins and the projections on the yoke 7 out of engagement with the locking-wheel 8.

From the foregoing description it is believed the following statement of the operation of this part of the mechanism will be understood. In the first place, it should be borne in mind that one of the stop-pins in the dial is always left in a raised position and that against this raised pin the swinging arm 16 is kept pressed by the operation of the type-wheel-shaft-rotating mechanism. When, therefore, a key is depressed for the designation of a given letter, a stop-pin corresponding to the key struck is thrown up from the dial, and simultaneously therewith a lever 62, (see Fig. 6,) actuated indirectly by the keys in a manner to be hereinafter described, is swung downward, and, bearing on the yoke 7, causes the projections 9 on said yoke to engage with the locking-wheel 8 on the type-wheel shaft, so as to hold said shaft from rotation, and at the same time causes arm 14 to depress the previously-raised or set-up pin, thereby releasing the arm 16 from said pin and permitting the spring 17$^b$, mounted on the arm 17, to force forward the arm 16 until it comes in contact with the projection 17$^a$ on the arm 17. While the type-wheel shaft thus remains locked and while the depression of the previously set-up pin and the advance of the arm 16 is thus taking place the impression-surface advances toward the type-wheel to make an impression in a manner to be hereinafter described. After the impression has been made, and while the depressed key is still continuing its downward movement, the yoke 7 is released, and, rising under the influence of the spring 25, becomes disengaged from the locking-wheel 8, thereby releasing the type-wheel shaft and permitting it to rotate till arrested by the contact of the lever 16 with the pin just raised, such contact and arrest taking place at the time the character on the type-wheel corresponding to the key struck reaches the printing-point. Upon the striking of the next key the stop-pin corresponding to that key is set up and the operations just described repeated, including the printing of the character designated by the previous key, as described. I would here state, in passing, that when the arm 16, after having been released from contact with one stop-pin, is by the rotation of the type-wheel shaft and connections brought around in contact with the next stop-pin the force of the blow in making such contact is very sensibly diminished by the yielding of the spring 17$^b$, and all liability of injury to or breakage of the parts is thereby obviated. I have already stated that after the stop-arm 16 has been released from engagement with one of the stop-pins the spring 17$^b$, bearing against it, causes it to make a slight advance—in other words, forces it up against the projection 17$^a$ on the arm 17. This advance movement of the arm 16 is necessary in order that it shall clear and pass fully beyond the depressed pin, so that if the depressed pin should happen to be the one next to be struck up the arm 16 and the type-wheel shaft to which it is connected would be required to make, the latter a complete and the former nearly a complete circuit, and in so doing insure the proper re-inking of the type-wheel, as will be explained farther on.

The fingers or levers 27, which are operated upon by the keys to raise or strike up the stop-pins of the dial, are made springy or elastic, so that when the same pin is employed twice in succession, in which case the action of the arm 14 on the one hand to depress and of the finger or lever on the other hand to raise said pin are concurrent, the finger or lever will yield when opposed by the action of the arm 14, and then reassert itself and press the pin upward into position.

The paper-carriage 144 is provided with rollers 145, which co-operate with ways 145$^a$ on the frame and serve to guide the carriage in its movements back and forth across the machine in front of the type-wheels. This carriage carries a roller 149, upon which the paper employed is wound, and another roller 146, which operates in connection with two presser-rollers 147 to feed the paper as each line is printed. To one end of the carriage is connected a strap 144$^a$, that leads to an ordinary spring-drum 144$^b$, as shown in Figs. 1 and 4, the spring in the drum operating at all times to keep the strap under tension, as will be readily understood.

To a pin or stud 141$^a$ on the paper-carriage is connected one member of a toggle 141, the other member of said toggle being connected to a lever 151, hung upon the axis or bearing of the paper-feed roll 146 and carrying a spring-pressed friction-pawl 152, which is adapted to co-operate with a friction rim or flange 154 on the end of the feed-roller, as shown in Fig. 29. The members of the toggle 141 are connected together by means of a link or block 141$^b$, through which passes a small screw-threaded eyebolt 142, the position of which is regulated by means of adjusting-nuts 143. To the eye of bolt 142 is attached a cord 136, which passes thence over a pulley 139, thence around a pulley 138, supported in the bracket 125, and thence around a third pulley 137, mounted on and carried by the hand-lever 118, and thence to a stud 135, to which it is connected. Each time the hand-lever is drawn forward two results are accomplished—namely, first, the toggle-arms 141 are straightened out by the pull upon the cord 136, thereby causing the lever 151 to be swung upon its axis, and, through the action of the friction-pawl 152 upon the friction-rim 154, cause the feed-roll 146 to be rotated a distance sufficient to feed or advance the paper to receive the impressions for the next line, and, secondly, the paper-carriage is drawn back bodily to starting-point, thereby winding up again, through the medium of the strap 144ª, the spring within the drum 144ᵇ.

The toggle-arms and the lever 151, operated by them, are retracted by means of a spring 143ª, as shown in Figs. 1 and 29.

Figure 24:
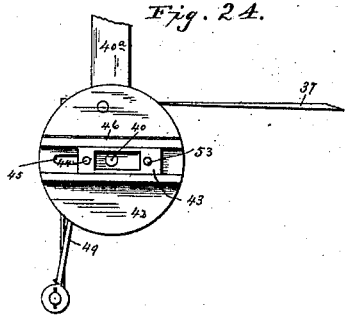
Figure 25:
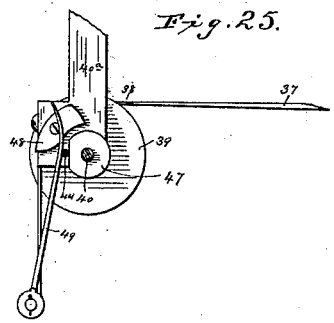
Figure 26:
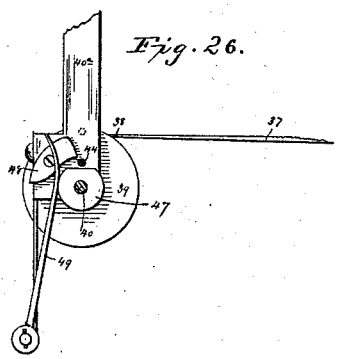
Figure 27:
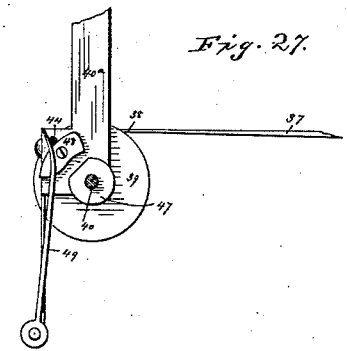
Figure 28:
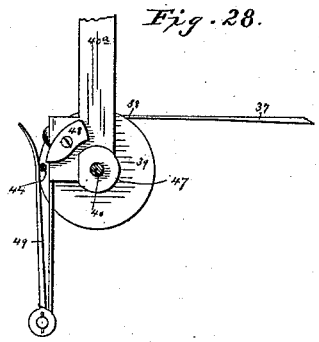

The mechanism by means of which the impressions are made by the type-wheels upon the paper is as follows: Upon the frame of the machine (see Figs. 1, 6, 22, and 23) is mounted a guide 58, in which is arranged a reciprocating slide or plunger 57, having a head 57ª, which is adapted to co-operate with whatever character happens to be at the printing-point and in the same plane with it to make an impression of such character upon the interposed paper. This slide or plunger 57 has connected to it one member 55 of a toggle, the other member 56 of the said toggle being connected to a block 59, rendered adjustable by a set-screw 60, as shown in Fig. 22. Connected to the toggle 55 56 is the upper end of a rod 54, the lower end of said rod being jointed to a pin 53 on a slide 43, which is adapted to work back and forth in a guide 46 on a disk 42, mounted on a shaft 40. (See Figs. 2 and 24 to 28.) This shaft 40 has its bearings in a bracket 40ª and carries upon its other end a disk 39, (see Fig. 6,) to the periphery of which is secured the flattened or strap-like end 38 of a rod 37, that is connected to an arm 36, secured to the rock-shaft 65, that is operated from the finger-keys through the medium of the cross-bar 64 and arms 64ª, as hereinbefore described. When the shaft 65 is rocked by the operation of a finger-key, the rod 37 is pulled, and its flattened or strap-like end, operating upon the drum 39, rocks the shaft 40 against the tension of a spring 41, applied to said shaft, and consequently rocks the disk 42. Now, the slide 43, which is arranged upon the disk 42, as before explained, is provided with a pin 44, which projects through a slot 45 in the disk 42 and extends out beyond the opposite side of said disk. Normally the position of the slide with respect to the disk is as represented in Fig. 24, and its pin 44 is located between the hub 47 of the disk and a stationary cam 48 and a spring-pressed arm 49, as seen in Fig. 25, while the pin 53, acting through the rod 54 and toggle 55 56, keeps the impression-plunger retracted; but on the disk 42 being turned by the depression of a finger-key through the described intervening mechanism the slide will revolve with said disk 42, and its pin 53 will operate through the rod 54 to straighten the toggle and cause the advance of the impression-plunger, while its pin 44 will be guided between the hub 47 of the disk, on the one hand, and the spring-pressed arm 49 and the cam 48, on the other hand, until a quarter-turn of the disk has been made, when the pin 44 will travel out from between the hub 47 and the cam 48 into the position shown in Fig. 26, and will then rise to the position shown by the dotted lines in said last-mentioned figure, the slide of course moving with it, and through rod 54 and toggle 55 56 effecting the retraction of the impression-plunger. It should be here stated that this rising of the slide upon the release of the guiding-pin 44, as just explained, is effected by the action of the spring 25, Fig. 18, acting upon the locking-yoke 7, and through the latter and the lever 62 and a connecting-rod 61 upon the toggle 55 56, as shown in Figs. 2 and 6. Upon the release of the finger-key the disk 42 will be rotated backward by the operating of the spring 41, applied to the shaft 40, and the pin 44 on the slide will travel down on the outside of the cam 48, the spring-arm 49 being pressed out and held out until the pin reaches the position shown in Fig. 28, when the spring-arm, reacting, will force it inward to the hub 47, as shown in Fig. 25, thus carrying the slide back to the starting-point, Fig. 24. In order to secure uniformity in the spacing between the characters printed, it is of course necessary that feed mechanism be provided which, after each character is printed, will advance the paper-carriage a distance corresponding to the width of said character, and since in this machine the depression of a key causes the designation of the next character to be printed and the printing of the character previously designated it follows that the operation of spacing for any given character must be initiated or commenced upon the designation of such character and completed upon the printing of the same.

The mechanism which I have devised for carrying this part of my invention into practice I will now proceed to describe.

Upon the paper-carriage is formed or attached a rack 117, Fig. 1, with which meshes a pinion 116 on a shaft 115, that also carries a gear-wheel 114, which meshes with another gear 113, that drives a pinion 98, mounted loosely upon the lower end of a tubular shaft 83. (See Figs. 7, 8, and 9.) This pinion 98 forms part of or is attached to a friction-rim 97, with which are adapted to engage friction-pawls 93, mounted on a disk 91, formed upon the hollow shaft 83. The last-mentioned shaft has secured to its upper end a horizontal arm 82, which is adapted for co-operation with a series of stop-pins 81, arranged in a dial 81ª, as shown. The hollow shaft 83 has a bearing 100 at its lower end, and through it passes a shaft 85, which is stepped in a socket 99 on a lever 101. (See Fig. 7.) A pin 88 passes through shaft 85 near the upper end of the latter and extends through a slot 89 in hollow shaft 83, from which it results that the shaft 85 is enabled to be raised and lowered without interfering with the hollow shaft 83, though neither shaft can be turned without turning the other also. The pin 88, after passing through the slot in the shaft 83, extends beneath the flange of a sleeve 76, that bears at its lower end one part 75 of a friction-clutch. Above said clutch the said sleeve is further provided with a locking and lifting arm 77, that is adapted to engage with a toothed locking-rim secured to the lower part of the dial 81ª in a manner to be presently described.

To the arm 82 of the hollow shaft 83 is pivoted a lever 84, the outer end of which stands normally above the raised pin 81, with which the arm 82 is in engagement, and the inner end of which is connected to the shaft 85. Upon a stationary sleeve or bearing 90 outside of the hollow shaft 83 is mounted a pinion 73, which bears the lower portion 74 of the friction-clutch last above referred to. With this pinion engages a toothed segment 72, that is mounted upon a shaft 71 and is adapted to be vibrated by the action of the finger-keys through the instrumentality of the arm 70, Fig. 11, a connecting-rod 69, Figs. 6 and 11, lever 66, shaft 65, arm 64ª, and cross-bar 64, as will be readily understood. The lever 101, upon which the vertical shaft 85 is supported, is adapted to be raised and lowered and locked in raised position and unlocked by the co-operating of two cam-levers 107 109 and an automatic latch 106. (See Fig. 7.) The cam-lever 107 is mounted upon and secured to the shaft 65, and is adapted to be operated from the finger-keys through arm 64ª and cross-shaft 64, before described; but the cam-lever 109 is mounted upon a separate shaft 34, Fig. 6, which shaft has secured to it arms 33, that are connected by a bar 35, and are slotted, as shown at 187, to receive a cross-bar 186, which is adapted to be struck by projections 32 on the finger-keys when the latter are depressed, so as to cause the rocking of said shaft 34.

Sufficient description has now been given of this spacing mechanism to enable a statement of its operation to be readily understood. Upon the depression of a finger-key the shaft 65, through the medium of the cross-shaft 64 and arm 64ª, is rocked forward, and by this motion two results are accomplished—to wit, first, the arm 66 is swung so as to draw upon the rod 69, turn the gear-segment 72, Figs. 7 and 11, rotate the pinion 73, and, through the coupled friction-clutch 74 75, rotate the sleeve 76 and cause the arm 77, borne by said sleeve, to travel around with it beneath the dial, and, secondly, the cam-lever 107 is swung forward through a portion of its movement. Then, as the finger-key continues to descend, its projection 32, striking the cross-bar 186, moves downward the arm 33 and rocks the shaft 34, thereby causing the cam-lever 109 to swing forward, raise the lever 101 sufficiently to cause the shaft 85 carried by it to raise the sleeve 76 thereby uncoupling the friction-clutch 74 75, and causing the arm 77 to immediately pass into engagement with the locking-rim 80 at the point to which said arm has traveled, thus arresting said arm 77. After the locking-arm has been thus engaged with the toothed rim a projection 108 on the still-moving cam-lever 107 strikes a roller 104 on the end of the lever 101 and raises said lever 101 still higher and until the shaft of said roller is engaged by the automatic locking-catch 106. As the result of thus further raising the lever 101 the shaft 85 is elevated higher, thereby causing the arm 77 to enter farther into the locking-rim and raise the stop-pin immediately above it, and also causing the arm 84, connected to the upper end of said shaft, to depress the stop-pin with which the arm 82 is engaged and permit the latter to swing around until arrested by the stop-pin in advance of the pin last raised, previously set up by the raising of the arm 77 into engagement with the locking-rim, the paper-carriage meanwhile advancing into position to receive the impression of the next character brought to the printing-point.

Since the various characters employed upon the same printing-wheel vary in width, it is necessary that the feed of the paper-carriage shall vary correspondingly, in order that there may be uniformity in the spacing of the letters printed, and inasmuch as the distance traveled by the stop-arm 82 in passing from one stop-pin of the dial to another regulates the distance which the paper-carriage is permitted to advance, and as the distance traveled by said stop-arm is determined by the arrest of the locking-lever 77 sooner or later, it follows that, if the point at which the locking-lever 77 is arrested can be determined by each finger-key as it is depressed, the very desirable result of having the feed for each character automatically determined by the designation of such character will be accomplished. In the present machine, in order to secure this desired result, I have formed the projections 32 on the keys longer or shorter, according to the amount of space required for the character designated by that key, the keys for designating the widest characters or those requiring the greatest amount of spacing having the shortest projections and the keys for the narrowest characters having the longest projections, so that when a key for designating a wide character is struck a longer interval will take place before the projection encounters the cross-bar 186 to set in operation the devices for arresting the arm 77, and thereby permit a greater feed of the paper-carriage than when a key for designating a narrow character and having a long projection is struck, as will be readily understood. Inasmuch as each key is designed to be struck for the designation of an upper-case as well as a lower-case character, and as the upper-case characters require a greater amount of spacing, I mount the cross-bar 186 in slots 187 in the arms 33 and connect it by rods 185 to bell-crank levers 184, arranged beneath the upper-case key 176 of the key-board, Fig. 6. While lower-case characters are being designated the cross-bar 186 stands near the outer portion of the slots 187, and when struck by the projections 32 gives the arms 33 a throw sufficient to give the proper spacing for such character; but when an upper-case character is designated the depression of the upper-case key 176 required for such operation causes the said cross-bar 186, through the action of the bell-crank 184 and rod 185, to be shifted to the inner ends of the slots 187, so that when the key corresponding to the character to be designated is depressed its projection 32 will strike said cross-bar 186 later, and by so doing permit a greater feed of the carriage to take place. Where the upper-case character is of much greater width than the lower-case character adapted to be designated by the same key, in which case a much greater feed is required, the projection 32 is cut away, as shown, Fig. 6ª, so that the engagement of said projection with the cross-bar 186 will be still longer delayed, and thus insure the necessary increase in feed.

Adjoining the type-wheels is located an inking-cylinder 164ª, Figs. 1, 4, 5, and 18, the inner circumference of which is supplied with printers' ink in any suitable manner. Into this cylinder projects a vertical shaft 160, which has a lower bearing 161 and is inclosed at its upper end by a sleeve 162, upon which is mounted an arm 163, carrying an inking-wheel 164, as shown in Fig. 18. A pin 165 projects from the shaft 160 through a straight slot 166 in the sleeve 162 (see Figs. 18 and 19) and through a curved slot 167 in the hub of the arm 163, Figs. 18, 19, and 20. A friction-rim 157, provided with a gear 156, is mounted loosely upon the sleeve 162, and is adapted to co-operate when rotated in one direction with friction-pawls 158, pivoted to a disk 158ª, Figs. 18 to 21, secured to the said sleeve 162. A gear-segment 155 is connected to the pivot or shaft 121, to which the hand-lever 118 is secured, and meshes with the pinion 156, as shown in dotted lines, Fig. 1. When the hand-lever 118 is drawn forward to return the paper-carriage to starting-point, the friction-rim 157 is rotated in the direction indicated by the arrow, Fig. 21, and, engaging with the friction-pawls 158, causes the sleeve 162 and, through the pin 165, the arm 163 and inking-roller 164 to be also rotated. The inking-roller in moving around travels in contact with the inner surface of the inking-cylinder, receives ink therefrom, and halts at the opening in the side of the cylinder into which the periphery of the type-wheels project and in contact with the type-wheel which happens to be in position for printing. As the type-wheel revolves the ink is transferred to the characters upon its periphery and is equalized and distributed by means of a distributing-roller mounted in a spring-pressed arm 171, as shown in Fig. 1. When the hand-lever, under the influence of the spring 118ª applied to it, as shown in Fig. 2, is returned to normal position after being pulled forward, as described, the friction-rim 157, through the described connections, is rotated in reverse direction, disengaging the pawls and leaving the sleeve and the connected arm and inking-wheel stationary.

In order that the type-wheels may be shifted up and down without interference from the inking-roller, I connect to the rod 173, which effects the shifting of the type-wheels, a lever 169, pivoted at 169ª and having a bifurcated end which engages with a grooved collar 169ᵇ on the shaft 160 of the inking apparatus, as shown in Fig. 18. When the rod 173 is raised to shift the type-wheels, the shaft 160 is lowered, and its pin 165, moving down the curved slot 167 in the hub of the arm 173, that carries the inking-roller, causes said arm to be moved slightly to one side, so as to momentarily withdraw the inking-roller from contact with the upper type-wheel and bring it back into contact with the lower type-wheel by the time the shifting operation has been accomplished. Of course when the type-wheels are lowered the described operation of throwing the inking-roller into and out of contact is repeated.

The outer end of the arm 171, which carries the distributing-roller 170, is normally engaged with a notch 172 in the rod 173, and when the said rod is shifted said arm is forced out of said notch, thereby withdrawing the distributing-roller from contact with the upper type-wheel and causing it to remain out of contact until the shifting operation has been completed, when the arm 171 will drop into another similar notch, thus bringing the distributing-roller into contact with the lower type-wheel. This movement is effected each time the shifting operation takes place.

In the use of this machine the last letter of a word designated is printed by striking the space or blank key. This leaves the machine with the stop-pin 20, Fig. 18, corresponding to the space or blank key set up, the arm 16 in contact with said pin, the space on the type-wheel at the printing-point, while the stop-pin of the feeding mechanism corresponding to the character last printed and the stop-pin corresponding to space is left set up, the arm 82 in engagement with the last-mentioned stop-pin, and the arm 84 above it, as shown in Fig. 7.

Assuming the machine to have been so left and that it is desired to print the word "The," the operation will be as follows: The operator will with one hand depress the upper-case key 176, Fig. 6, which will cause the type-wheels to be raised, so as to bring the lower wheel 4 into printing position and be there locked by the automatic operation of the spring-pressed bell-crank lever 178 and pin 177, said bell-crank lever assuming the positions shown in dotted lines, Fig. 6. As a further result of depressing the upper-case key, the bell-crank levers 184 will be rocked, and, through rods 185, will cause the cross-bar 186 to advance to the inner portion of the slots 187 in the arms 33. While the upper-case key is kept depressed the operator will then with his disthe impression mechanism, Figs. 22 to 24. In the normal operation of the machine the pin 53 plays freely back and forth in the slot 203, and the operation of the impression devices is not therefore effected by the said rod 202; but when in the correcting operation the shaft 199 is rocked by the push-bar the arm 201 is swung backward, and thereby causes the end of the slot 203 to bear against the pin 53 and force the slide in its guide until the said pin coincides with the center of the shaft 40, as shown in dotted lines, Fig. 22, so that when the shaft 40 is rocked by the operation of the key employed in designating the correct or substituted letter no motion of the connecting-rod 54, jointed to said pin 53, will take place and no reciprocation of the impression-slide effected, and hence no impression made.

It will be noticed that the same hand-lever which aids in winding up the type-wheel-propelling mechanism is also employed to bring back the paper-carriage and wind up its propelling mechanism. The connections between the lever and said two propelling mechanisms are, however, of necessity made flexible and independent, (cords being preferably employed,) so that when the lever is operated each propelling mechanism will be re-wound to an extent required by the amount of work it has done since the last movement of the lever. It will further be noticed that my letter-space-feed mechanism embraces means for setting the feed for a given character upon the designation of such character through the medium of a finger-key and means for executing the feed for the character designated upon the designation of the same or another character through the medium of a finger-key. In short, a primary and secondary impulse are required to designate and complete the feed for any given character, and for convenience this group of instrumentalities will be referred to in the claims as "double-impulse letter-space-feed mechanism." It will also be observed that the arm 77 operates to set a pin 81 in the feed-dial, thereby designating in advance the space required for the letter to be printed upon the designation of a subsequent character. This arm moves forward intermittently by variable steps, according to the width of the letter to be printed, and thus becomes an intermittently-rotating designator for designating the feed-spaces in advance.

I make no claim to the method herein described of printing, consisting in designating a character to be printed at one operation and simultaneously setting a feed corresponding to the width of such character, printing the character previously designated at a second operation, and simultaneously therewith executing the feed corresponding with the character; nor do I broadly claim in this application certain means or mechanism herein shown and described for automatically removing the ink-roller from contact with the type-carriers while said carriers are moving from lower to upper case and during the return movement. Neither do I claim in this application certain particular means or instrumentalities herein described whereby the carrier is adjusted and held steady while the impressions are being taken and the press returned to its normal position, and whereby, when a character is to be repeated, the consecutive action of one designating-key will print the corresponding character and bring it again to the printing-point, these inventions being embraced in my prior application No. 170,645, filed July 3, 1885.

Where my invention consists in the combination of two or more groups of elements I wish it to be understood that I do not confine myself to the particular train or assemblage in each group, any equivalent train of gearing which will perform the several functions of the groups being manifestly the equivalent in the combination of those described herein for the purpose.

Having thus described my invention, what I claim as new is—

1. In a type-writing machine, the combination of mechanism for designating a character to bring it to the printing position, mechanism for printing the character previously designated, and double-impulse letter-space-feed mechanism constructed to set a feed at one operation and to execute said feed at another operation, substantially as described.

2. In a type-writing machine, the combination of mechanism for designating a character to be printed, mechanism for printing the character previously designated, and double-impulse letter-space-feed mechanism constructed to set a feed corresponding to the width of the designated character and to execute a feed corresponding to the imprinted character, substantially as described.

3. In a type-writing machine, the combination of a paper-carriage and a dial with movable pins for regulating the letter-space movement of said carriage, substantially as described.

4. In a type-writing machine, the combination of a paper-carriage, an arm moved by the advance of said carriage, and a series of movable stops to arrest the advance of said carriage through the instrumentality of said arm, substantially as described.

5. In a type-writing machine, the combination of a paper-carriage, an arm moved by the advance of said carriage, a series of movable stops for arresting the advance of said carriage through the instrumentality of said arm, and a designating-arm for projecting said stops into the path of the traveling arm, substantially as described.

6. In a type-writing machine, the combination of a paper-carriage and a traveling arm moved by the advance of said carriage, and a series of movable stops for obstructing the advance of said carriage, and an arm for severally removing the designated stops from the path of the traveling arm, substantially as described, and for the purpose specified.

7. In a type-writing machine, the combination of paper-carriage and a traveling arm moved by the advance of said carriage, a series of movable stops for obstructing the travel of said arm and advance of said carriage, and a designating-arm for severally projecting said stops into the path of the traveling arm, and an arm for severally removing said stops from obstructing the travel of said arm, substantially as described, and for the purpose specified.

8. In a type-writing machine, the combination of a paper-carriage, a traveling arm moved by the advance of said carriage, a series of feed-designating stops for arresting the advance of said carriage through the instrumentality of the traveling arm, a designating-arm for projecting said stops into the path of the traveling arm, and a toothed locking-ring, substantially as described, and for the purpose specified.

9. In a type-writing machine, the combination of a paper-carriage, a traveling arm moved by the advance of said carriage, a series of feed-designating stops for arresting the advance of said carriage, through the instrumentality of the traveling arm, a feed-designating arm for projecting said stops into the path of the traveling arm, and a clutch for imparting an intermittent rotary movement to the designating arm, substantially as described, and for the purpose specified.

10. In a type-writing machine, the combination of the paper-carriage, a traveling arm moved by the advance of said carriage, a series of feed-designating stops for arresting the advance of said carriage through the instrumentality of the traveling arm, a feed-designating arm for severally projecting said stops into the path of the traveling arm, a clutch for imparting an intermittent rotary movement to the designating-arm, and a series of finger-keys with connecting mechanism for imparting motion to said clutch, substantially as described, and for the purpose specified.

11. In a type-writing machine, the combination of the paper-carriage, traveling arm, feed-designating stops, feed-designating arm, clutch, finger-keys, toothed locking-ring, and the arm for removing the designating-stops from the path of the traveling arm, substantially as described, and for the purpose specified.

12. In a type-writing machine, the combination of the paper-carriage, the traveling arm, feed-designating stops, feed-designating arm, clutch, and shaft or rod for opening the clutch, substantially as described, and for the purpose specified.

13. In a type-writing machine, the combination of the paper-carriage, the traveling arm, feed-designating stops, feed-designating arm, clutch, shaft or rod for opening the clutch, and the toothed locking-ring, substantially as described, and for the purpose specified.

14. In a type-writing machine, the combination of the paper-carriage, the traveling arm, the feed-designating stops, the feed-designating arm, the clutch, the shaft or rod for opening the clutch, the toothed locking-ring, and the arm for removing the obstructing-stops from the path of the traveling arm, substantially as described, and for the purpose specified.

15. In a type-writing machine, the combination of a series of finger-keys, a rod common to said keys, a clutch deriving motion from the action of said keys through the common rod and connecting mechanism, a shaft or rod for opening said clutch through the action of the cam-lever 109, and the feed-designating arm, substantially as described, and for the purpose specified.

16. In a type-writing machine, the combination of a series of finger-keys, a rod common to said keys, a clutch deriving motion from the action of said keys through their common rod and connecting mechanism, the shaft or rod for opening said clutch, the feed-designating arm, and toothed locking-ring, substantially as described, and for the purpose specified.

17. In a type-writing machine, the combination of a series of finger-keys, a rod common to said keys, a clutch deriving motion from the action of said keys through the medium of their common rod and connecting mechanism, the shaft or rod for opening said clutch, the feed-designating arm, and toothed locking-ring and feed-stops, substantially as described, and for the purpose specified.

18. In a type-writing machine, the combination of a series of finger-keys, a rod common to said keys, a clutch deriving motion from the action of said keys through the medium of their common rod and connecting mechanism, the shaft or rod for opening said clutch, the feed-designating rod, toothed locking-ring, feed-stops, paper-carriage, traveling arm moved by the advance of the carriage, and the arm for removing the feed-stops from the path of the traveling arm, substantially as described, and for the purpose specified.

19. In a type-writing machine, the combination of a series of finger-keys, a feed-designating rod 186 common to all of the keys, having varying projections, a cam 109, lever 101, shaft or rod 85, and the clutch whereby the movement imparted to said key-levers operates to open said clutch at points varying in the arc of its travel, substantially as described, and for the purpose specified.

20. In a type-writing machine, the combination of a series of finger-keys, a feed-designating rod 186 common to all of the keys, cam 109, lever 101, shaft or rod 85, for opening the clutch, the clutch, and feed-designating arm, substantially as described, and for the purpose specified.

21. In a type-writing machine, the combination of a series of finger-keys, a feed-designating rod 186 common to all of the keys, cam 109, lever 101, shaft or rod 85, clutch, feed-designating arm, and toothed locking-ring, substantially as described, and for the purpose specified.

22. In a type-writing machine, the combination of a series of finger-keys, a feed-designating rod 186 common to all of the keys, cams 109 107, lever 101, shaft or rod 85, clutch, feed-designating arm, toothed locking-ring, feed-stops, with traveling arm arrested by said stops, the paper-carriage, and the arm for removing the obstruction-stops from the path of the traveling arm, substantially as described, and for the purpose specified.

23. In a type-writing-machine, the combination of a series of finger-keys, a feed-designating rod 186 common to all of the keys, cam 109, lever 107 with its auxiliary cam 108, lever 101, shaft or rod 85, clutch, feed-designating arm, toothed locking-ring, feed-designating stops, traveling arm co-operating with said stops, paper-carriage, and the arm for removing the obstructing feed-stops from the path of the traveling arm, substantially as described, and for the purpose specified.

24. In a type-writing machine, the combination of the intermittently-rotating designator 77, the lever 101, mechanism for connecting the designator and lever, and the automatic locking-lever 106, substantially as described.

25. In a type-writing machine, the combination of the designating-stops, the designating-arm, part 75 of the clutch, the locking-lever 106, and connecting mechanism, substantially as described, and for the purpose specified.

26. In feed mechanism for type-writing machines, the combination of the intermittently-rotating designator 77, a series of movable stops actuated by said designator, a clutch having an intermittently-rotating section for operating said designator, and a vibrating section, finger-keys, and connecting mechanism for operating said designator through said clutch, substantially as described.

27. In a type-writing machine, the combination of an intermittent rotary designator 77, a clutch having a vibratory section and an intermittent rotary section, lever 101, for operating the clutches, and locking-lever 106, substantially as described.

28. In a type-writing machine, a double-impulse letter-space-feed mechanism having a reciprocating and intermittently-rotating designator.

29. A double-impulse letter-space feed consisting of the combination of means for designating a feed-space when a character is designated and means for executing said designated feed when a subsequent character is designated, substantially as described.

30. In a type-writing machine, a letter-space feed having a clutch one section of which has an oscillatory movement and the other an intermittent rotary movement and a movement parallel with its axis, and operating mechanism, all substantially as described, and for the purpose specified.

31. In a type-writing machine, the combination of the finger-key levers with the feed-designating rod 186, the clutch, and the cam 109, whereby the variable movements imparted to said designating-rod by each several key-lever will be transmitted through said cam to uncouple the clutch and thereby accommodate the uniformly-moving parts of the feed mechanism to the variable moving parts, substantially as described, and for the purpose specified.

32. In a type-writing machine, the combination of a series of finger-key levers representing the characters to be printed from, each lever recessed according to the width of the character or characters it represents, a feed-designating rod common to said levers, and a dial containing a series of movable stops and connections whereby the letter-space movement of the paper-carriage is regulated according to the varying depths of the recesses in said key-levers, substantially as described, and for the purpose specified.

33. In a type-writing machine, the combination, with the toothed locking-rim beneath the dial of the paper-carriage-feeding mechanism, of the arm co-operating with said rim, the sleeve to which said arm is connected, the vertical shaft operating, as described, to raise said sleeve and arm, the lever upon which the vertical shaft is supported, and means, substantially as described, for raising said lever, as set forth.

34. In a type-writing machine, the combination, with the toothed rim beneath the dial of the paper-carriage-feeding mechanism, of the arm co-operating with said rim, the sleeve to which said arm is connected, the springs operating to depress said sleeve and arm, the vertical shaft operating, as described, to raise said sleeve and arm, and the lever and connections, substantially as described, for lifting said vertical shaft, as set forth.

35. In a type-writing machine, the combination, with the dial of the paper-carriage-feeding mechanism, of the sliding pins in said dial, the horizontally-swinging arm for engaging said pins, the hollow shaft to which said arm is secured, the pinion carrying the friction-rim, the friction-pawls connecting said friction-rim to said hollow shaft, the paper-carriage, and gearing, substantially as described, between the paper-carriage and the pinion bearing the friction-rim, whereby the paper-carriage is kept in check by the stop-pins of the said dial, as set forth.

36. In a type-writing machine, the combination, with the dial of the paper-carriage-feeding mechanism, of the sliding pins in said dial, the horizontal swinging arm normally held against one of the raised pins by the propelling devices applied to the paper-carriage through mechanism substantially as described, the vertically-swinging arm for depressing the pins of the dial, the shaft to which said arm is connected, and mechanism, substantially such as described, for raising said shaft, so as to cause the depression of the pin, the advance of a horizontally-swinging arm to the next pin, and the feed of the paper-carriage, as set forth.

37. In a type-writing machine, the combination, with the dial of the paper-carriage-feeding mechanism and the sliding pins in said dial, of the vertically-movable shaft, the locking-rim, the arm engaging with said rim and connected with said shaft, as described, and mechanism, substantially as described, operating upon the depression of the key to first raise the shaft, so as to bring the locking-arm into engagement with the locking-rim, and then cause said arm to raise another stop-pin above the dial, as set forth.

38. In a type-writing machine, the combination, with the dial of the paper-carriage-feeding mechanism and the sliding pins in said dial, of the swinging arm, the vertically-moving shaft to which the same is connected, the locking-rim, the co-operating locking-arm, also connected to said vertical shaft, as described, and mechanism, substantially as described, operating upon the depression of a key to first raise the shaft, so as to bring the locking-arm into engagement with the locking-rim, and then by a further movement cause said locking-arm to raise another stop-pin above the dial and simultaneously cause the depression of the stop-pin that stands beneath the vertically-swinging arm, as set forth.

39. In a type-writing machine, the combination, with the dial of the paper-carriage-feeding mechanism and the sliding pins in said dial, of the horizontally-swinging arm normally held against one of the raised pins by the propelling-power applied to the paper-carriage through mechanism substantially as described, the vertically-swinging arm for depressing the dial-pins, the shaft to which said arm is connected, the locking-rim, the arm for engaging therewith, and mechanism, substantially such as described, for raising the vertical shaft, so as to cause the engagement of the locking-lever with the locking-rim, the raising of a pin in the dial, the depression of the pin with which the horizontally-swinging arm is engaged, and the advance of said arm to the next succeeding pin of the dial and the consequent feeding forward of the paper-carriage, as set forth.

40. In a type-writing machine, the combination, with the dial of the paper-carriage-feeding mechanism, of the locking-rim, the locking-arm for co-operating with said rim, devices including a clutch for rotating said arm beneath the locking-rim upon the depression of a finger-key, and mechanism, substantially as described, for lifting the locking-arm into engagement with the locking-rim and at the same time uncoupling the aforesaid clutch, as set forth.

41. The combination, with the dial of a paper-carriage-feeding mechanism, of the locking-rim, the locking-arm for co-operating with said rim, the sleeve on which said locking-arm is mounted, carrying one portion of a friction-clutch, the vertically-movable shaft, the pinion carrying the other portion of the friction-clutch, the vibratory gear-segment for rotating the pinion, and mechanism, substantially such as described, for imparting motion to the gear-segment upon the depression of the finger-keys, as set forth.

42. The combination, with the dial of the paper-carriage-feeding mechanism, of the locking-rim, the locking-arm for co-operating with said rim, the sleeve on which said locking-arm is mounted, carrying one portion of a friction-clutch, the vertically-movable shaft, means, substantially as described, for raising it, the pinion carrying the other portion of the friction-clutch, the vibratory gear-segment for rotating the pinion, and mechanism, substantially as described, for imparting motion to the gear-segment upon the depression of the finger-keys, as set forth.

43. In a type-writing machine, the combination, with the dial of the paper-carriage-feeding mechanism, having the movable stop-pins, of the horizontally-swinging arm for engaging with said stop-pins, the hollow shaft to which said arm is connected, and a supplemental clutch and driving mechanism for causing the rotation of said shaft irrespective of the paper-carriage-advancing mechanism, as set forth.

44. In a type-writing machine, the combination, with the dial of the paper-carriage-feeding mechanism, having movable stop-pins, of the horizontally-swinging arm for engaging with said stop-pins, the hollow shaft to which said arm is connected, the supplemental friction-pawls connected to said shaft, the supplemental friction-rim and its pinion, and the vibrating segment-arm and the spring for actuating it, as set forth.

45. In a type-writing machine, the combination of the dial of the paper-carriage-feeding mechanism, having the movable stop-pins, the horizontally-swinging arm for engaging with said stop-pins, the hollow shaft to which said arm is connected, the friction-pawls, friction-rim, means, substantially as described, for rotating said friction-rim by the paper-carriage-propelling devices, means, substantially as described, for preventing the rotation of the hollow shaft by the said paper-carriage-propelling devices, and supplemental devices, substantially as described, for rotating said hollow shaft and connections when said last-mentioned devices are rendered inoperative, as set forth.

46. In a type-writing machine, the combination, with the dial of the paper-carriage-feeding mechanism, having the movable stop-pins, as described, of the vertically-swinging arm for depressing said stop-pins, the vertically-movable shaft to which said arm is connected, the lever supporting said shaft, the two vibratory cam-arms for in turn raising said last-mentioned lever, and the keys and intermediate connections for moving said cam-arms, as set forth.

47. In a type-writing machine, the combination, with the lever, the vertically-movable shaft, the clutch, the paper-carriage-feeding mechanism, and vibratory cam-arms for raising said lever, of an automatic latch or catch for holding the lever when fully raised, as set forth.

48. In a type-writing machine, the combination, with the lever, of the vertically-movable shaft, the clutch, the paper-carriage-feeding mechanism, the automatic catch for locking the lever when fully raised, and the two vibratory cam-arms, one of which operates to partially raise the lever and the other to fully raise it and engage it with the locking-catch and afterward automatically disengage it therefrom, as set forth.

49. In a type-writing machine, the combination of an intermittently-rotating type-carrier, a dial containing a series of movable stops, co-operating mechanism to bring the carrier to rest when a stop is in operative position, mechanism for withdrawing the operative stop when another is set, and mechanism for rotating the carrier from the stop withdrawn to the stop set, substantially as described.

50. In a type-writing machine, the combination of the upper-case key with type-carriers and a lock for retaining the carrier at upper case after the upper-case key has been returned to normal position and the trip for releasing the type-carriers from the operation of the lock upon the designation of a lower-case character, substantially as described, and for the purpose specified.

51. In a type-writing machine, the combination of the upper-case key with the type-carriers, the finger-key levers, the feed-designating rod, the lock for temporarily retaining the carriers at upper case, as specified, and the trip for releasing the carriers, as specified, whereby the upper-case key retains the carriers at upper case until an upper-case character has been designated and a corresponding feed set, and then return to normal position, carrying the feed-designating rod 186 with it, leaving the type-carriers at upper case until the designation of a lower-case character causes the upper-case character to be printed, the corresponding feed executed, and the carrier's release from the operation of the lock, substantially as described, and for the purpose specified.

52. In a type-writing machine, the combination of the adjustable type-wheels, a key to bring the upper-case characters into line with the press, and means for automatically locking them in position after the release of the upper-case key and for automatically releasing them upon striking and operating a key.

53. In a type-writing machine, the combination of an upper-case-key, vibrating arms, feed-designating rod arranged in slots in the vibrating arms, and a series of letter-designating finger-key levers adapted severally to co-operate in feeding letters and characters of varying width, substantially as described, and for the purpose specified.

54. In a type-writing machine, the combination, with the paper-carriage and means, substantially such as described, for advancing the same, of a dial and stop-pins, an arm kept normally pressed against one of the stop-pins of the dial by the paper-carriage-advancing mechanism, and supplemental mechanism, substantially such as described, for withdrawing said arm from the control of the paper-carriage-advancing devices and rendering it subject to the action of said supplemental mechanism, whereby upon the depression of the stop-pin with which the arm is engaged said arm is enabled to be advanced to the next stop-pin without permitting any feed of the paper-carriage.

55. In a type-writing machine, the combination, with the dial of the paper-carriage-feeding mechanism, having the movable stop-pins, of the shaft bearing the arm for engaging with said pins, the friction-rim and pawls through which said shaft is rotated by the paper-carriage-advancing mechanism, the supplementary friction-rim and pawls also co-operating with said shaft, the segment-arm, pinion, and spring for rotating said last-named friction-rim, and the break-arm for applying friction to the first-mentioned friction-rim, substantially as set forth, and for the purpose specified.

56. In a type-writing machine, substantially such as herein described, wherein the characters to be printed are designated by one operation and imprinted by a subsequent operation, the combination of a paper-carriage, its propelling mechanism, and correction mechanism by which the letter-space movement of the carriage is suspended while substituting a new or different character for the one precedently designated, substantially as and for the purpose specified.

57. In a type-writing machine, substantially such as herein described, wherein the characters to be printed are designated by one operation and imprinted by a subsequent operation, the combination of a press for imprinting the characters and correction mechanism for suspending the action of said press while substituting a new or different character for the character precedently designated, substantially as described, and for the purpose specified.

58. The combination of a printing device or press, a paper-carriage, correcting mechanism for simultaneously suspending the advance of the paper-carriage and the action of the printing-press, a series of finger-keys, and a letter-space feed, the combination being such that a character erroneously at the printing-point may be withdrawn before the impression is made and the feed therefor executed and a new character may be brought to the printing-point and its proper feed designated, substantially as described.

59. In a type-writing machine, the combination of a movable paper-carriage, a traveling arm, and a series of feed-designating stops, a connecting-clutch for communicating the movement of the paper-carriage to the traveling arm, a brake co-operating with the connecting-clutch for suspending the action of the paper-carriage, and a mechanism consisting, substantially, of a spring and actuating clutch supplemental to the connecting-clutch for advancing the traveling arm when the movement of the paper-carriage has been suspended, substantially as described, and for the purpose specified.

60. In a type-writing machine, the combination of the correction-key with a brake and connecting-clutch for suspending the advancing of the paper-carriage and the spring and supplemental clutch for advancing the traveling arm when the travel of the carriage has been suspended, substantially as described, and for the purpose specified.

61. In a type-writing machine, the combination of the correction-key, the spring compressed by the action of said key, the traveling arm actuated by said spring, and means for locking the carriage in position, substantially as described, and for the purpose specified.

62. In a type-writing machine, the combination of a paper-carriage, spacing mechanism for regulating the advance of said carriage, a clutch for connecting the space mechanism with the carriage, a correction-key for suspending the action of said clutch, a second clutch, and means for operating the spacing mechanism through said second clutch when the action of the carriage has been suspended, substantially as described.

63. In a type-writing machine, the combination of the correction-key, the clutch through which the traveling arm of the feed mechanism derives its movement from the advance of the paper-carriage, the paper-carriage, the supplemental clutch, and the traveling arm, substantially as described, and for the purpose specified.

64. In a type-writing machine, the combination of a movable paper-carriage, a connecting-clutch through which the movement of said carriage is transmitted to the traveling arm of the feeding mechanism, the correction-key, spring compressed by said key, supplemental clutch, and traveling arm of feeding mechanism, substantially as described, and for the purpose specified.

65. In a type-writing machine, the combination of the dial for controlling the type-wheels, with its movable stops, the elastic levers for actuating said stops, finger-keys for actuating said levers, and an arm for restoring said stops to their normal conditions, substantially as described, and for the purpose specified.

66. In a type-writing machine, the combination, with the type-carriers, of the movable stops for regulating the movements of the type-carriers and the elastic levers for actuating said stops, substantially as described, and for the purpose specified.

67. In a type-writing machine, the combination of the dial for controlling the type-carriers, with its movable stops, the elastic levers for actuating said stops, and the finger-keys, substantially as described, and for the purpose specified.

68. In a type-writing machine, the combination of the type-wheels and their shaft, the toothed locking-wheel on said shaft, the vertically-adjustable locking-yoke, the guide-pins 11 for said yoke, the spring 25, for raising the yoke, and the arm 62, for compressing the same, substantially as described.

69. In a type-writing machine, the combination, with the dial and its movable stop-pins, of the type-wheel shaft and the type-wheels thereon, the arm mounted on the shaft for engaging with the stop-pins, and the vertically-moving arm for depressing the raised pins, substantially as described.

70. In a type-writing machine, the combination of the movable type-carrier, a dial having a series of movable stops, an arm intermediate between the stops and the carrier co-operating to bring the carrier to rest, and the clutch to prevent the contra-action of said carrier when arrested, substantially as described, and for the purpose specified.

71. In a type-writing machine, the combination of the intermittently-rotating type-wheel shaft and its co-operating arm, the dial and its movable stops for arresting the movement of said shaft, and a clutch to prevent the contra-rotation of said shaft, substantially as described.

72. In a type-writing machine, the combination of type-carriers, the dial containing the movable stops to control said carrier, and the friction or biting clutch to prevent the contra-action of said carriers, substantially as described, and for the purpose specified.

73. In a type-writing machine, the combination of the movable stop-pins with a rotatable type-wheel shaft and its type-wheel, the swinging arm mounted on the type-wheel shaft for engaging the stop-pin, and a clutch for preventing the rebound or backlash when said arm comes in contact with either of said stop-pins, substantially as described.

74. In a type-writing machine, the combination of the dial and its movable stop-pins with the type-wheel shaft and type-wheels thereon, the swinging arm mounted on the type-wheel shaft, the vertically-movable arm for depressing the raised pins, and the clutching devices for preventing backward movement of the swinging arm and connected parts when a stop-pin is struck by said arm, substantially as described.

75. In a type-writing machine, the combination, with the dial and its movable stop-pins, of the vertically-moving arm for depressing the raised pins, the elastic levers for raising the pins, and the finger-keys, whereby when said depressing-arm and a raising-lever operate upon said pin at the same time the lever will yield and thus prevent interference with the operation of the machine.

76. In a type-writing machine, the combination, with the type-wheel shaft and means for locking it, of the co-operating dial, its movable stop-pins, the laterally-swinging arm mounted on the type-wheel shaft, the vertically-moving arm for depressing the pins, and means, substantially as described, for giving a slight forward impulse to the laterally-swinging arm after the pin with which the arm has been engaged is depressed and before the type-wheel shaft is unlocked, substantially as described, and for the purpose specified.

77. In a type-writing machine, the combination, with the type-wheel shaft and its type-wheel, of the dial and its movable stop-pins, the vertically-moving arm for depressing the pins, the sleeve to which said arm is connected, the spring for raising it, and means, substantially as described, for lowering it, as set forth.

78. In a type-writing machine, the combination, with the type-wheel shaft, of the drum geared thereto, the hand-lever, the cord extended from the hand-lever to the drum, the spring-fusee and the cord extending from the drum to said fusee, whereby the force of the spring within the fusee is relied upon as the motor to drive the type-wheel shaft, and whereby, also, said spring is kept wound up by the operation of the hand-lever through the above-described instrumentalities, substantially as described.

79. In a type-writing machine, the combination, with the finger-keys or key-levers, of the type-wheels, the rod and lever for adjusting said wheels vertically, the bell-crank lever co-operating with the pin or projection on said rod to keep the latter elevated, the latch mounted on said bell-crank lever, and the lever operated through the instrumentality of the finger-keys for striking the latch and swinging the bell-crank lever, so as to permit the rod and said type-wheels to automatically descend, substantially as described.

80. In a type-writing machine, the combination, with the dial of the printing mechanism, the movable stop-pins therein, the type-wheel shaft, and the sleeve on said shaft carrying the arm for depressing said stop-pins, of the push-rod and described intermediate connections for lowering at will the sleeve and causing the arm connected thereto to depress the stop-pin with which the laterally-swinging arm is in engagement, substantially as described.

81. In a type-writing machine, the combination of a movable type-carrier, a series of separately-movable stops, a series of finger-keys, connecting mechanism for setting said stops, mechanism for co-operating with the keys, and stops for withdrawing a stop from operative position upon subsequently depressing the same or another key, substantially as described.

82. In a type-writing machine, the combination of a movable type-carrier, a series of movable stops, and a traveling arm co-operating with said stops to arrest said carrier, said arm having a slight forward movement independent of said carrier, substantially as described, and for the purpose specified.

83. In a type-writing machine, the combination, of a movable type-carrier, the lock-wheel co-operating with the same, the laterally-swinging arm, the laterally-swinging and vertically-moving arm, and the stops whereby upon the depression of the stop the laterally-swinging and vertically-moving arms will have a slightly forward movement imparted to them before the type-carrier is released from the control of the locking-wheel and lock, which hold it at the printing-point for a short period after the depression of the stop, substantially as described, and for the purpose specified.

84. In a type-writing machine, the combination of the laterally-swinging arm, the vertically-moving arm mounted loosely on the type-wheel shaft, and means for stopping and releasing the type-wheel shaft, substantially as described, and for the purpose specified.

85. In a type-writing machine, the combination of the type-wheel shaft, suitable stops, the laterally-swinging arm, the laterally-swinging and vertically-moving arm mounted loosely thereon, and the arm rigidly attached to the shaft, substantially as described, and for the purpose specified.

86. In a type-writing machine, the combination, with the stops, the type-wheel shaft, and the laterally-swinging arm having a movement independent of said shaft, of the laterally-swinging arm rigidly attached to said shaft for controlling the independent movement of said first-mentioned arm, substantially as described, and for the purpose specified.

87. In a type-writing machine, the combination of a motor for propelling the type-wheels, a motor for advancing the paper-carriage, and a single winding mechanism common to both motors for severally restoring said motors to their normal working condition by one operation, whether said motors are unequally exhausted or not, such restoration being to each the extent of its separate exhaustion, substantially as described.

88. In a type-writing machine, the combination of a spring normally under tension for propelling the type-wheel, a spring normally under tension for propelling the paper-carriage, and a winding-lever common to both springs for restoring them to normal condition.

89. In a type-writing machine, the combination, with the paper-carriage, of the feed-roll mounted thereon and provided with friction-flange, the pivoted arm bearing the friction-pawl, the toggle connected to said arm, and the hand-lever and connecting-cords, whereby at each vibration of the hand-lever the feed-roll will be advanced and the arm carrying the friction-pawl moved back ready for engagement with the flange of the feed-roll the next time the hand-lever is vibrated, substantially as described.

90. In a type-writing-machine, the combination, with the paper-feed roll having the friction-flange, of the arm carrying the friction-pawl, the toggle connected to said arm, the cord and lever for operating the toggle, and adjusting devices, substantially such as described, for regulating the throw of the toggle, and consequently the distance the paper is fed or the spacing between lines, as set forth.

91. In a type-writing machine, the combination, with the reciprocating bar, of the impression mechanism, the toggle connected thereto, the rod jointed to the toggle, the slide, and the rocking disk with which said slide co-operates, substantially as described.

92. In a type-writing machine, the combination, with the reciprocating bar, of the impression mechanism, the toggle, the slide, and rod connecting it to the toggle, the disk in which said slide works, and means, substantially as described, for rocking the shaft on which said disk is mounted, as set forth.

93. In a type-writing machine, the combination, with the slide connected to the toggle of the impression mechanism, of the disk in which the slide works, and means, substantially such as described, for rocking the shaft on which said disk is mounted, and the pin, hub, cam, and spring-pressed arm for guiding the slide when the disk is rocked, substantially as described.

94. In a type-writing machine, the combination of the reciprocating impression-bar, its operating-toggle, the connecting-rod, the disk 42, slide 43, pin 44, hub 40, cam 48, and spring-arm 49, all connected for operation substantially as described.

95. In a type-writing machine, the combination, with the slide connected to the toggle of the impression mechanism, of the disk on which the slide is mounted, means, substantially such as described, for rocking the shaft to which the disk is secured, the pin, hub, cam, and spring-pressed arm for guiding the slide when the disk is rocked, and the push-bar, rock-shaft, and connecting-rods of the correcting mechanism for adjusting the slide so as to render it inoperative upon the rod connected to the impression mechanism, substantially as described.

96. In a type-writing machine, the combination, with the reciprocating impression-bar, its toggle, and means, substantially as described, for operating said toggle, of the locking-yoke for arresting the type-wheel, the lever bearing upon said yoke, and the rod connecting said lever to the toggle of the impression mechanism, whereby the locking of the type-wheel is insured while the impression is being made, as set forth.

97. In a type-writing machine, the combination, with the type-wheels, of the inking-cylinder having the opening in its side into which the peripheries of the type-wheels project and revolving arm carrying an inking-roller which travels over the inked inner surface of the inking-cylinder and applies ink to the type-wheels, substantially as described.

98. In a type-writing machine, the combination, with the inking-cylinder and type-wheels, of the revolving arm carrying the inking-roller, the hand-lever by which the paper-carriage is drawn back, and intermediate mechanism, substantially such as described, whereby upon the drawing forward of the said hand-lever the inking-roller is caused to traverse the inner surface of the inking-cylinder and apply ink to the type-wheel in the plane with it, substantially as described.

99. In a type-writing machine, the combination, with the inking-cylinder and type-wheels, of the revolving arm carrying the inking-roller, the hand-lever by which the paper carriage is drawn back, and intermediate mechanism, such as described, including a clutch, for causing the revolving arm and inking-roller to be rotated upon the drawing forward of said hand-lever, but to remain undisturbed while the hand-lever is returning to normal position, as set forth.

100. In a type-writing machine, the combination, with the type-wheels, of the inking-cylinder, the shaft projecting within the inking-cylinder, the sleeve on said shaft, having the straight slot, the arm carrying the inking-roller and having the curved slot in its hub, the pin on the shaft projecting through both said slots, and means for raising the shaft, whereby the shifting of the shaft causes the arm carrying the inking-roller to be moved out of or into contact with the type-wheels, substantially as described.

101. In a type-writing machine, the combination, with the type-wheels, of the shaft within the inking-cylinder, the sleeve on said shaft, having the straight slot, the arm carrying the inking-roller and having the curved slot in its hub, the vertical rod by which the type-wheels are shifted, and connections, substantially such as described, whereby upon the shifting of the type-wheels the arm carrying the inking-roller is moved so as to carry the inking-roller out of contact with the type-wheel and again into contact therewith when the shifting operation has been accomplished, as set forth.

102. In a type-writing machine, the combination, with the type-wheels, the inking-cylinder having the opening in its side into which the peripheries of the type-wheels project, and the revolving arm carrying the inking-roller, of the distributing-roller for evenly distributing the ink applied by the inking-roller, substantially as described.

103. In a type-writing machine, the combination, with the paper-carriage and the lever by which the same is drawn back, of an inking-roller, an inked surface with which the said roller co-operates, and mechanism, substantially such as described, between the lever and inking-roller, whereby upon the operation of the lever the inking-roller is rotated, substantially such as described.

CHAS. T. MOORE.

Witnesses:
W. J. ARMSTRONG,
A. L. SALT.